(12) United States Patent
Wallenius

(10) Patent No.: US 6,975,855 B1
(45) Date of Patent: Dec. 13, 2005

(54) METHOD FOR MANAGING MOBILE STATION FACILITIES

(75) Inventor: Jukka Wallenius, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/958,065

(22) PCT Filed: Apr. 26, 2000

(86) PCT No.: PCT/FI00/00359

§ 371 (c)(1),
(2), (4) Date: Jan. 15, 2002

(87) PCT Pub. No.: WO00/67515

PCT Pub. Date: Nov. 9, 2000

(30) Foreign Application Priority Data

Apr. 28, 1999 (FI) .................................. 990963

(51) Int. Cl.⁷ .............................................. H04M 3/42
(52) U.S. Cl. ................................... 455/417; 455/432.3
(58) Field of Search ........................... 455/433, 432.3, 455/435.1, 417, 920

(56) References Cited

U.S. PATENT DOCUMENTS 5,206,899 A    4/1993  Gupta et al.
6,603,969 B1 * 8/2003  Vuoristo et al. ............ 455/433

FOREIGN PATENT DOCUMENTS

WO    WO 97/25828   7/1997
WO    WO 99/07106   2/1999

OTHER PUBLICATIONS

Eleftheriadis et al., User Profile Identification in Future Mobile Telecommunications Systems, IEEE Network, Sep./Oct. 1994, pp. 33-39.

* cited by examiner

Primary Examiner—Creighton Smith
(74) Attorney, Agent, or Firm—Pillsbury Winthrop Shaw Pittman LLP (57) ABSTRACT

A method for managing facilities of a first mobile station in a mobile communication system, in which multiple alternative subscriber profiles can be defined for mobile stations, including establishing a connection to a predetermined service control function, inputting information required for identification of the first and a second mobile station to the service control function, retrieving first mobile station's subscriber data from the first mobile station's subscriber register, forming a new subscriber profile for the second mobile station based on the subscriber data retrieved from the first mobile station's subscriber register such that calls can be made with the second mobile station using the first mobile station's subscriber data, and storing reference to the second mobile station for the first mobile station in the subscriber register such that calls terminating at the first mobile station are forwarded to the second mobile station.

16 Claims, 10 Drawing Sheets

METHOD FOR MANAGING MOBILE STATION FACILITIES

This is a National Stage Application of International Application No. PCT/FI00/00359 which was filed on Apr. 26, 2000 in the English language.

The present invention relates to facility management in a mobile communication system, and particularly to the management of mobile station subscriber profiles.

A solution enabling the utilisation of several subscriber profiles by means of one mobile station (MSP, Multiple Subscriber Profiles) is previously known from the GSM mobile communication system (Global System for Mobile communications), for example. By means of a single SIM card (Subscriber Identity Module), a separate leisure time profile and a separate work-engaged profile, for example, can thus be defined for a mobile station. A mobile station user can receive and make calls with the profile selected, whereby the costs of the call made, for example, are directed to the selected profile. Correspondingly, a mobile station can be provided with several numbers, and by using these numbers, a call is forwarded to the mobile station in question. Using the same mobile station, a mobile station user can thus receive calls that are made to his/her work number and calls made to his/her leisure time number. The available profiles are defined by the operator, after which a mobile station user can manage the profiles opened by the operator with his mobile station in such a manner that the desired profile is used.

Call forwarding, which is also known from the GSM system, makes it possible to forward a mobile-terminated call to some other interface. A mobile station user can define conditions by means of his mobile station, and when the conditions are fulfilled, the call is forwarded. Such conditions may for example be that the mobile station is not reached or that the mobile station is not answered when a call is terminating. A mobile station user can further define by means of the mobile station that all calls terminating at the mobile station are forwarded to some other interface.

Although the known mobile communication systems offer subscribers a chance of using various subscriber profiles and call forwarding, the utilisation of these facilities is, however, fairly difficult. In the known solutions, creation of a new subscriber profile, for instance, requires that the operator is contacted. Only after the operator has created the subscriber profile, a mobile station user can select it for use by means of his mobile station.

The object of the present invention is to eliminate the above drawbacks and to provide a solution enabling a more flexible use of mobile station facilities and making the mobile communication system more user-friendly. This object is achieved by a method of the invention for managing facilities of a first mobile station in a mobile communication system, in which multiple alternative subscriber profiles can be defined for mobile stations. The method of the invention is characterized by comprising the steps of: establishing a connection to a predetermined service control function, inputting information required for identification of the first and a second mobile station to the service control function, retrieving subscriber data of the first mobile station from a subscriber register of the first mobile station, forming a new subscriber profile for the second mobile station on the basis of the subscriber data retrieved from the subscriber register of the first mobile station such that calls can be made with the second mobile station by using the subscriber data of the first mobile station, and storing a reference to the second mobile station for the first mobile station in said subscriber register such that calls terminating at the first mobile station will be forwarded to the second mobile station.

The object of the invention is also achieved by the second embodiment of the method of the invention, which is a method for managing facilities of a first mobile station in a mobile communication system, in which multiple alternative subscriber profiles can be defined for mobile stations. This preferred embodiment of the method of the invention is characterized by comprising the steps of: establishing a connection to a predetermined service control function, sending information required for identification of the first and a second mobile station to the service control function, retrieving subscriber data of the first mobile station from a subscriber register of the first mobile station, forming a new subscriber profile for the second mobile station on the basis of the subscriber data retrieved from the subscriber register of the first mobile station, such that calls can be made with the second mobile station by using the subscriber data of the first mobile station, and storing a reference to the second mobile station for the first mobile station in said subscriber register such that calls terminating at the first mobile station will be forwarded to the second mobile station.

The invention also relates to a mobile communication system, in which the method of the invention can be employed. The mobile communication system of the invention comprises: at least a first and a second mobile station, a subscriber register which maintains at least subscriber data of the first mobile station, and memory means which maintain information on subscriber profiles of the second mobile station. The mobile communication system of the invention is characterized in that the system comprises: a service control function comprising means for: retrieving the subscriber data of the first mobile station from the subscriber register of said first mobile station, forming a new subscriber profile for the second mobile station on the basis of the subscriber data retrieved from said subscriber register, such that calls can be made with the second mobile station by using the subscriber data of the first mobile station, and storing a reference to the second mobile station for the first mobile station in said subscriber register such that calls terminating at the first mobile station will be forwarded to the second mobile station.

The invention further relates to a service control function which is in data transmission connection with a mobile communication system comprising a mobile services switching centre, at least a first and a second mobile station, a subscriber register which maintains at least the subscriber data of the first mobile station, and memory means which maintain information on subscriber profiles of the second mobile station. The service control function of the invention is characterized in that it comprises means for: retrieving the subscriber data of the first mobile station from the subscriber register of said first mobile station, storing in said memory means a new subscriber profile for the second mobile station on the basis of the subscriber data retrieved from said subscriber register, and storing a reference to the second mobile station for the first mobile station in said subscriber register.

The invention is based on the idea that the mobile communication system becomes more and more user-friendly when a system user can manage the facilities of the first mobile station in such a manner that the subscriber identity of the first mobile station can be transferred into the subscriber profile of the second mobile station. Thus, if for example a mobile station owner has forgotten his mobile station at home, he can change the facilities of his own mobile station via the mobile station of his wife in such a manner that information relating to his own mobile station, e.g. identifying information and service information, is transferred into the subscriber profile of his wife's mobile station. Identifying information can for example be MSISDN or IMSI (International Mobile Subscriber Identity). In this case, calls that are made to his mobile station are forwarded to his wife's mobile station. Correspondingly, costs of calls he makes with his wife's mobile station are directed to his own mobile station telephone bill, when he, in connection with calls to be made with his wife's mobile station, selects a subscriber profile for use, into which profile the subscriber identity of his own mobile station is transferred.

According to the invention, it is possible to create a new subscriber profile using the mobile station and calling a special service number, for instance. Hence, creation and implementation of a subscriber profile become considerably easier and more flexible as in the known systems in which creation of a new subscriber profile requires that the system operator is contacted. A call by which a new subscriber profile is created can be made either from the first mobile station or the second mobile station when the subscriber identity of the first mobile station is transferred into the subscriber profile of the second mobile station. The service control function can thus receive the information required for the identification of the mobile station used for the call from the mobile communication network, to which it is conveyed in a manner known per se when a call is made. Other information that is needed can for example be keyed using the keyboard of the mobile station used for making the call. According to the invention, a new subscriber profile can also be created in some other way, for example by means of a computer terminal and the Internet, whereby a connection is established by the computer terminal and the Internet to the service control function in order to input the required information to it.

The most remarkable advantages of the invention are that creation of a subscriber profile that covers the subscriber identity of some other mobile station is very simple and user-friendly, since a system user can create the new subscriber profile by himself, that calls can be made very easily with somebody else's mobile station by using one's own mobile station subscriber data, for example in such a manner that the calls made can be included in one's own mobile station bill, and that a user can change the facilities of his own mobile station more flexibly.

In a preferred embodiment of the mobile communication system of the invention the system comprises a WAP server in data transmission connection with the service control function, which WAP server comprises means for receiving information conveyed in the format according to the WAP protocol from the second mobile station and for inputting the received information to the service control function in order to form a new subscriber profile for the second mobile station. This embodiment of the invention enables the implementation of a user interface that is highly user-friendly. A mobile station user can thus be inquired about the information required by the service control function by means of input forms enabled by the WAP protocol, after which the WAP server conveys the necessary information further to the service control function. This embodiment of the invention thus enables the implementation of a graphic user interface, when the subscriber identity of the first mobile station is needed to be transferred into the subscriber profile of the second mobile station.

The preferred embodiments of the method, mobile communication system and service control function of the invention are disclosed in the appended dependent claims 2 to 4, 6 to 7, 9 to 14 and 16.

Figure 1:
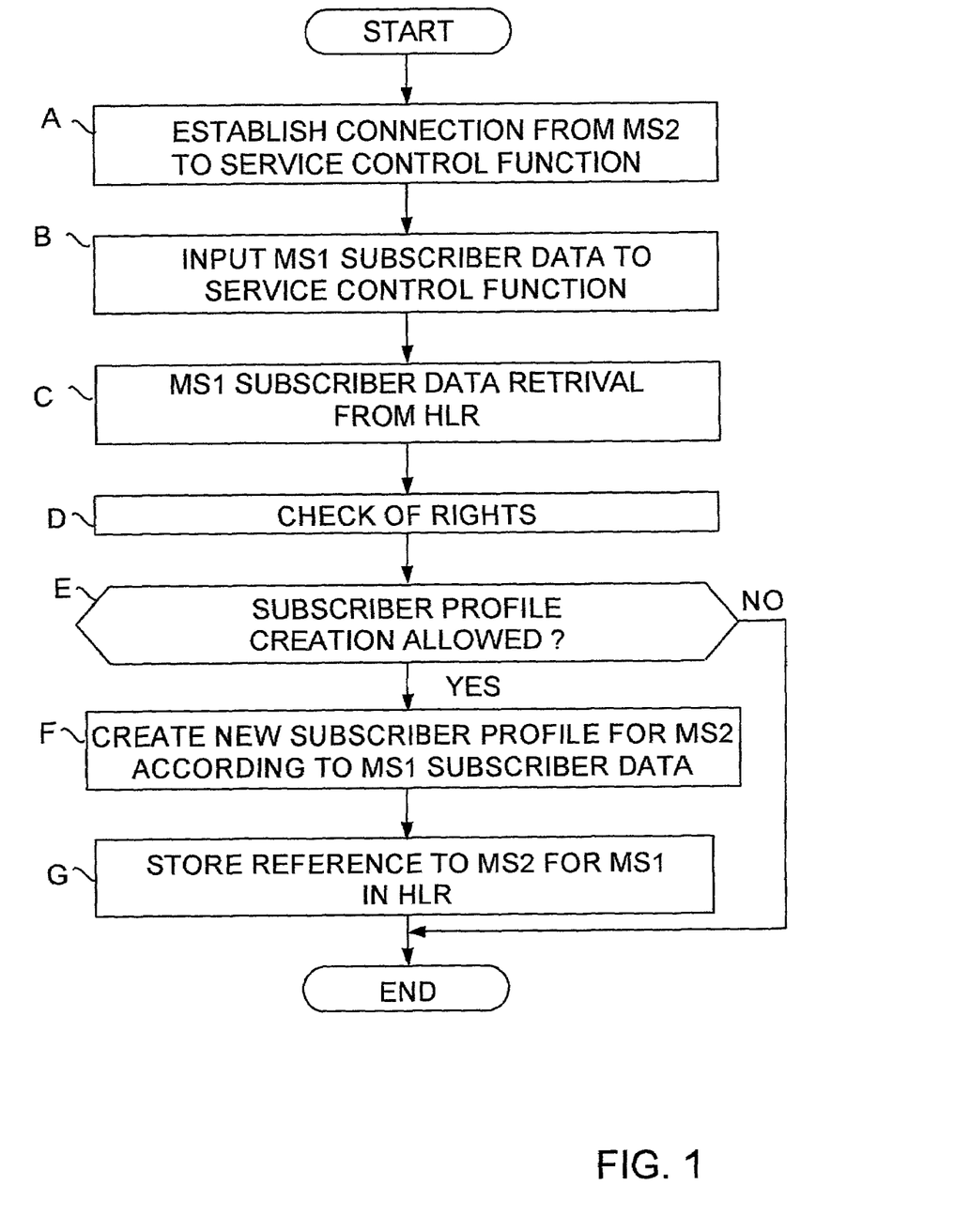
FIG. 1 shows a flow chart of the first preferred embodiment of the method of the invention.

In the following the invention will be described in greater detail by way of example with reference to the attached drawings, in which:

FIG. 1 shows a flow chart of the first preferred embodiment of the method of the invention. The flow chart of FIG. 1 can be applied in a similar mobile communication system as the GSM system (Global System for Mobile communications), for example, in which subscribers have the chance of forming several subscriber profiles MSP (Multiple Subscriber Profile) on a SIM card (Subscriber Identity Module).

In block 1, a connection is established from the second mobile station MS2 to the service control function CSE (Camel Service Environment) of the system, and in block B the information required for the identification of the first mobile station MS1 is input to the service control function. This may be carried out for example in such a manner that a call is made from the second mobile station MS2 to a predetermined service number, after which the required information is input by means of DTMF signals (Dual Tone Multi-Frequency) to the service control function via the keyboard of the second mobile station MS2. Alternatively the information can be input to the service control function such that the information to be input is transmitted from the second mobile station in the form of a text message to the service control function, or such that the information is input by means of an input form implemented by the WAP (Wireless Application Protocol) system or the MExE (Mobile Station Execution Environment) system. The code implementing the input form can be loaded into the mobile station in advance or it can be loaded into the mobile station in connection with the information inquiry.

The service control function includes all service logic and service control. A service control function can be only a logical function and it can be implemented internally in a variety of ways. A service control function can be internally decentralized and the service logic relating to it can be decentralized into various nodes. Service data can also be decentralized into different nodes than service logic.

When using an input form that is implemented by the WAP or MExE system or some other mobile-based execution environment to input information, the service control function can also be understood as an arbitrary network-based server application that can be addressed by a URL or an Internet address. It is also possible that this server application is further in connection with a CAMEL type, or IN type in general, service control function, which performs part of the steps of the method that relates to the implementation of the service. Characteristics of the IN are triggering, state models and a protocol which gives controls. A control or an operation may also be a call or some other method that relates to entities.

At least the information required for the identification of the first mobile station MS1, e.g. the telephone number of the mobile station MS1 (MSISDN, Mobile Station International ISDN Number), must be conveyed to the service control function CSE. The information required for the identification of the second mobile station MS2, e.g. the subscriber identity A (MSISDN), is conveyed to the service control function in a call made to the service control function or in a text message sent to the service control function.

In block C, the subscriber data of the first subscriber station MS1 is retrieved from the subscriber register HLR of said mobile station.

In block D, a check of rights is performed. This is done preferably so that the misuse of the system could be prevented. The check of rights can be performed for example in such a manner that it is checked on the basis of the information retrieved (along with other subscriber data) from the subscriber register HLR of the mobile station MS1, whether an identification code transmitted from the second mobile station MS2 to the service control function is right. If this identification code is right, the creation of a new subscriber profile is allowed, and block F is entered.

The identification code can be transmitted from the second mobile station by a variety of alternative ways, such as:
  entering a password via the keyboard,
  a mobile station may comprise a reader, to which an identification card is set, after which the second mobile station reads the identification code from the card and forwards it. The connection may alternatively be a bluetooth or infrared connection, by which the identification card can be in connection with the mobile station, or
  a challenge-response solution can be used, in which a code is transmitted from the network to the second mobile station, after which the mobile station calculates the right response for the code it has received by means of the received code and the identification card, for example, and transmits the response to the network as an identification code.

In block F, a new subscriber profile is created for the second mobile station MS2 on the basis of the information retrieved from the subscriber register of the mobile station MS1. Then, the information retrieved from the subscriber register is copied into the memory, in which information on the subscriber profiles of the second mobile station MS2 is maintained in a manner known per se. The memory can be located in connection with the subscriber register of the second mobile station MS2, for example. Thus, the subscriber identity (IMSI) of the first mobile station MS1 can be stored as the subscriber profile of the second mobile station MS2 in such a manner that by means of the first mobile station, e.g. calls can be made, and the billing of these calls is concentrated on the second mobile station MS2.

When the subscriber identity of the first mobile station is stored as the subscriber profile of the second mobile station MS2, information on the services of the first mobile station MS1 is stored at the same time for example in the subscriber register of the second mobile station. Thus, the same services are provided in the new subscriber profile of the mobile station MS2 as is normally available for the mobile station MS1. If the mobile station MS1 has had several subscriber profiles available, a mobile station MS2 user can select a subscriber profile among these several profiles of the mobile station MS1 to form a new subscriber profile for the second mobile station MS2. This can be done for example in such a manner that in block F the service control function informs the mobile station MS2 user by means of a speech or text message that he can choose between several subscriber profiles, after which the mobile station MS2 user keys e.g. via the keyboard a number code indicating which subscriber profile he wants to select.

In block G, a reference to the second mobile station MS2 is stored in the subscriber register HLR of the first mobile station MS1. In addition, a reference to the subscriber register of the second mobile station MS2 can also be stored for the subscriber station MS1 in the SRF element (Signalling Relay Function) of the system and the subscriber register HLR. The SRF element is used in call routing in the system to find out in which subscriber register the subscriber data of the mobile station having a specific MSISDN number is stored. In the GMSC (Gateway Mobile Switching Centre) of the mobile communication system, a reference can further be stored to refer to the subscriber register of the second mobile station MS2 for the mobile station MS1, so that the GMSC could route the call properly right from the beginning. Because of the above measures, calls terminating at the first mobile station MS1 are forwarded to the second mobile station MS2.

Figure 2:
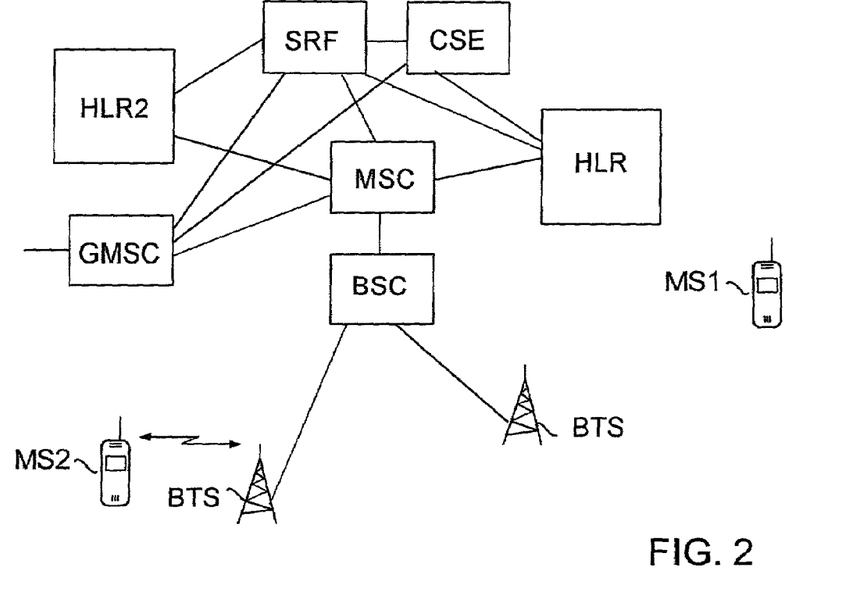
FIG. 2 shows a block diagram of an embodiment of the mobile communication system of the invention.

FIG. 2 shows a block diagram of an embodiment of the mobile communication system of the invention. The mobile communication system of FIG. 2 can be the GSM system, for instance, which comprises base transceiver stations BTS, a base station controller BSC and a mobile services switching centre MSC to convey calls to subscriber stations of the system. FIG. 2 also shows a service control function CSE enabling the offering of intelligent network services, and an SRF element (Signalling Relay Function). Intelligent network functions can be implemented for example in accordance with CAMEL architecture (Customised Applications for Mobile network Enhanced Logic) of ETSI. The service control function CSE may comprise all service logic and service control. A service control function is only a logical function and it may be implemented internally in a variety of ways. One alternative is that it is decentralized internally and service logic related to it can be decentralized in various nodes. Service information may also be decentralized in different nodes than service logic.

FIG. 2 shows the first mobile station MS1, whose subscriber data are maintained in the subscriber register HLR. Correspondingly, FIG. 2 shows the second mobile station MS2, whose subscriber data are stored in the subscriber register HLR2. The service control function CSE illustrated in FIG. 2 enables in accordance with the invention that the facilities of the first mobile station MS1 can be managed through the second mobile station MS2. Via the service control function CSE, the subscriber identity of the first mobile station MS1 can be transferred into the subscriber profile of the second mobile station MS2. To achieve this, a call is made in the example of FIG. 2 from the mobile station MS2 to a predetermined service number. The call in question activates a facility in the service control function CSE, and by means of a speech message, for example, the facility requests the user of the second mobile station to enter the identifier, e.g. a telephone number, needed for the identification of the first mobile station MS1. Thereafter, the service control function CSE can request the user of the mobile station MS2 in the speech message to enter a password of the mobile station MS1. This way it can be ensured that the user of the second mobile station MS2 really has the right to transfer the subscriber identity of the first mobile station MS1 as the subscriber profile of his own mobile station MS2. The service control function CSE of the second mobile station MS2 identifies the second mobile station MS2, for example, on the basis of the subscriber identifier A that is conveyed from the mobile services switching centre MSC of the second mobile station MS2.

When the service control function CSE has received the information input by the second mobile station MS2, the subscriber register HLR in which the subscriber data of the mobile station MS1 is stored is identified on the basis of the first mobile station MS1 number. Thereafter, the service control point retrieves the subscriber data of the mobile station MS1 from the subscriber register HLR in question and checks on the basis of these data, whether the password entered by the second mobile station MS2 is right.

When subscriber data have been read, the service control function CSE stores in the SRF element of the system a reference for the first mobile station MS1 to the subscriber register HLR2 of the second mobile station MS2. In addition, the service control function stores a reference to the second mobile station MS2 in the subscriber register HLR of the first mobile station MS1. In the case of FIG. 2, the service control function CSE may further store in the mobile services switching centre GMSC (Gateway Mobile Switching Centre) a reference for the first mobile station MS1 to the subscriber register of the second mobile station. Hence, calls terminating at the mobile station MS1 are forwarded to the second mobile station MS2.

On the basis of the subscriber data read from the subscriber register HLR, the service control point CSE creates a new subscriber profile for the mobile station MS2. The service control function stores the information on this subscriber profile in the memory reserved for this purpose, which memory is by way of example assumed in the following to be located in the subscriber register HLR2 of the second mobile station MS2. The information relating to the subscriber profile includes e.g. triggering information indicating in which situations the new created subscriber profile should be used.

When a new profile is created, calls can be made from the second mobile station MS2, and the calls are billed from the first mobile station MS1. The profile is preferably identified by means of a prefix, which is before the telephone number (number B) to be dialled, e.g. *1#123456. In this case, costs of the call to be made from the second mobile station to the number 123456 are included in the telephone bill of the first mobile station MS1, and the subscriber identifier A that is composed of the telephone number (MSISDN) of the first mobile station is conveyed to the call recipient. An alternative subscriber profile can also be registered as a default profile in advance such that the profile to be used does not need to be identified separately when making a call. The registration of the profile as a default profile can be performed for example by means of a USSD message with a specific content.

Figure 3:
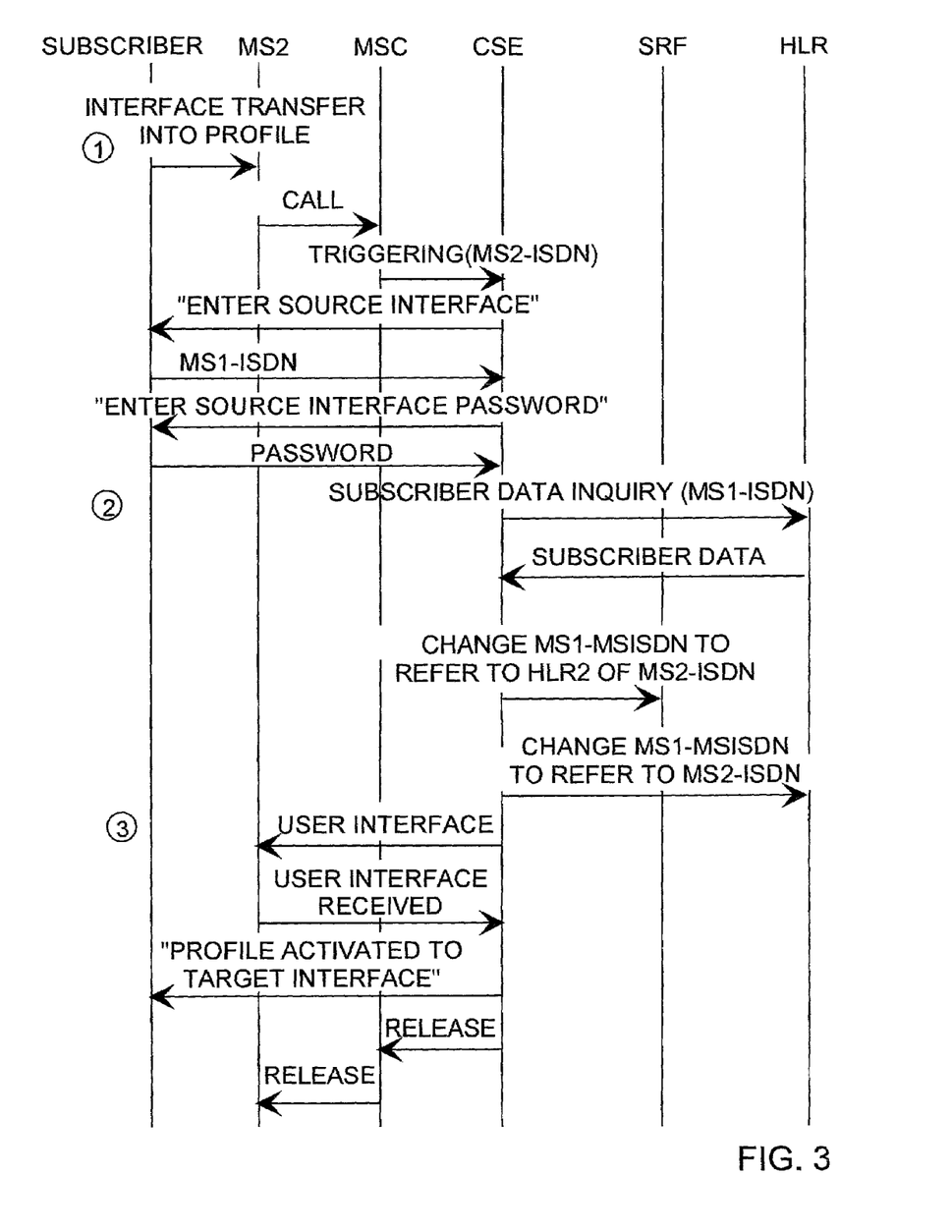
FIG. 3 illustrates signalling in connection with creation of a new subscriber profile.

FIG. 3 illustrates signalling in connection with creation of a new subscriber profile in the system of FIG. 2. In FIG. 3 it is assumed that subscriber data of the first and the second mobile station are maintained in different subscriber registers. In step 1, the mobile station MS2 makes a call, for instance, to a specific service number to create a new subscriber profile. The subscriber register HLR2 of the second mobile station MS2 detects on the basis of the used number that the call in question requires that intelligent network services are offered for the mobile station MS2. The mobile services switching centre MSC obtains this information from the subscriber register, and it triggers the creation of a new profile by sending a triggering message to the service control function CSE. The MSISDN number, i.e. telephone number, of the first mobile station MS1 and a password is input to the service control function CSE.

In step 2 of FIG. 3, subscriber data of the first mobile station are read from the subscriber register HLR, after which the subscriber identity of the first mobile station MS1 is transferred into the subscriber profile of the second mobile station MS2. In step 3, a user interface is loaded to the second mobile station MS2, by which user interface a user can manage subscriber profiles defined for the second mobile station MS2.

Figure 4A:
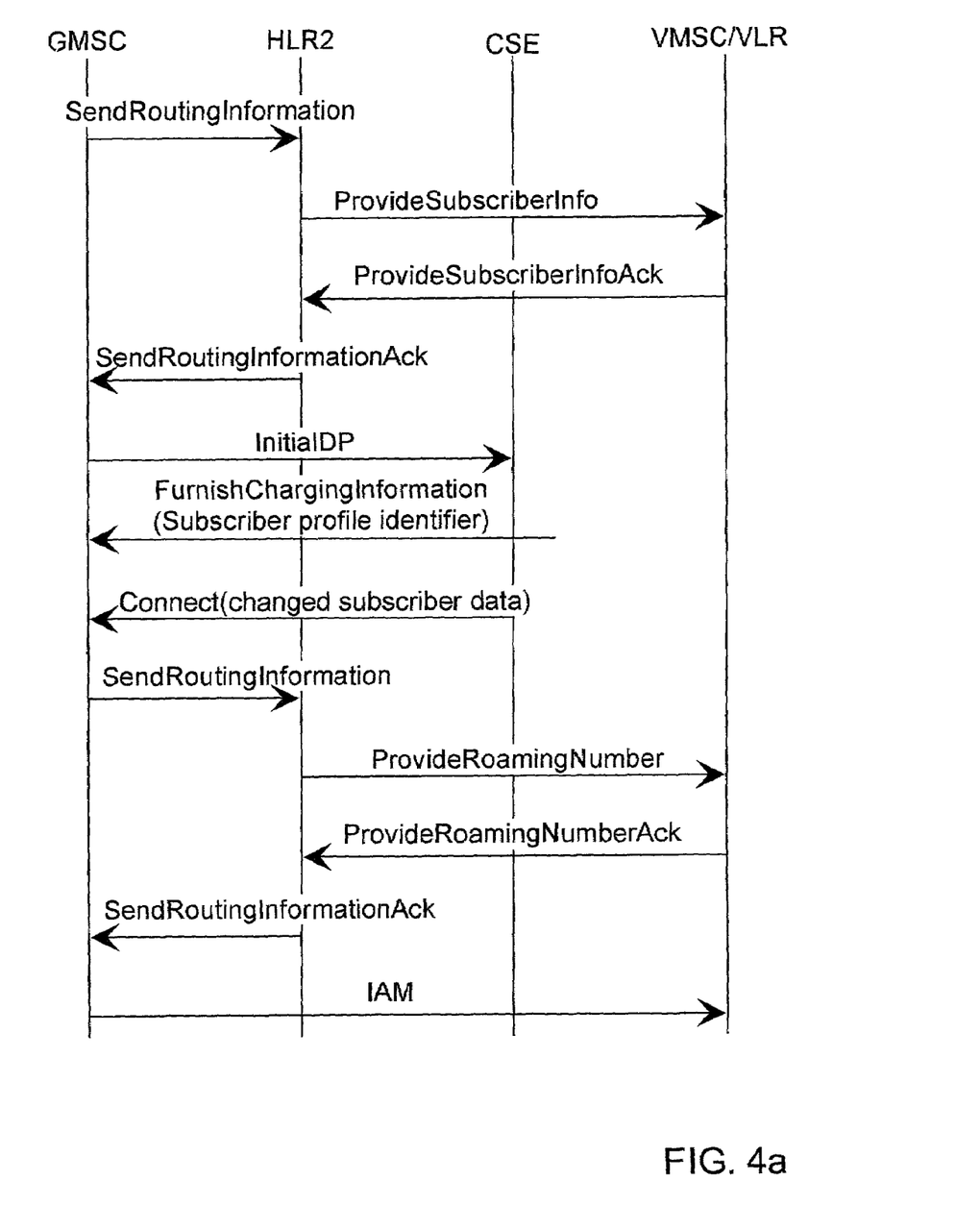
FIGS. 4a and 4b illustrate signalling in connection with a call set-up.
Figure 4B:
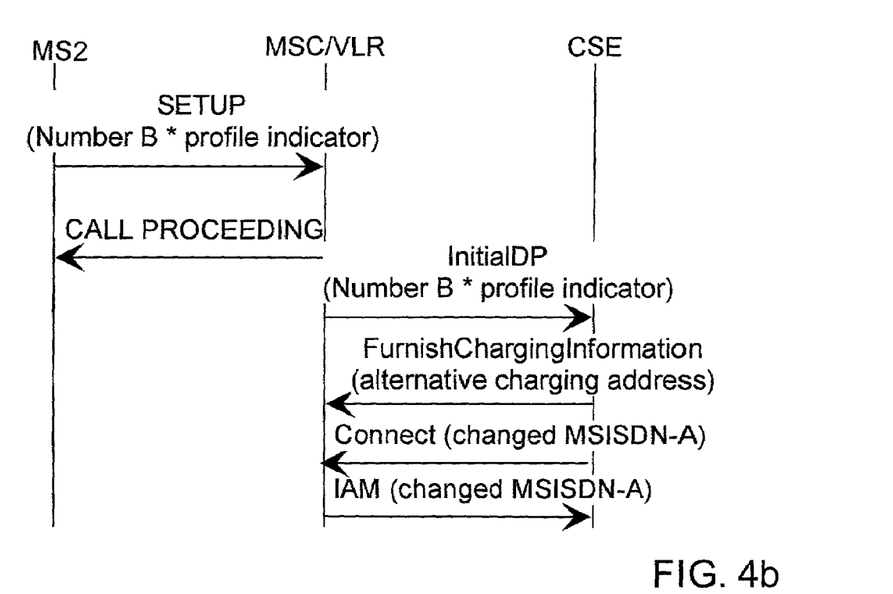

FIGS. 4a and 4b illustrate signalling in connection with a call set-up.

FIG. 4a shows how network elements signal between a mobile services switching centre GMSC routing a call, a subscriber register HLR2 of the second mobile station, a service control function CSE and a visitor location register VLR, when a call terminating at the mobile station MS1 is forwarded to the mobile station MS2 due to the transfer of the subscriber identity of the mobile station MS1 into the subscriber profile of the second mobile station MS2. In the example of FIG. 4a it is assumed that the first and the second mobile station are in the same network.

FIG. 4b shows how network elements signal between a mobile station MS2, a mobile services switching centre MSC and a service control function CSE, when a call is made from the mobile station MS2, which is provided with several alternative subscriber profiles. Information on the subscriber profile used in the call is thereby conveyed to the mobile services switching centre MSC in a SETUP message.

The transfer of the subscriber identity of the first mobile station MS1 into the subscriber profile of the second mobile station MS2 does not hinder calls from the mobile station MS1. In this kind of a situation, however, the mobile station MS1 preferably conveys a warning to its user (e.g. by means of warning text on the display of the mobile station MS1) when a call is to be made. At the same time the mobile station MS1 can, for instance with the text appearing on the display, inquire the user whether he wants to switch off calls terminating at the mobile station MS1 from the mobile station MS2. A warning text and an inquiry of whether calls terminating at the mobile station MS1 are to be prevented from coming to the mobile station MS2 may preferably appear on the display of the mobile station MS1 until the switching to the second mobile station MS2 has been eliminated. This could be done on the basis of the message sent from the service control function CSE to the first mobile station MS1. In this case, however, calls that are made using the subscriber profile that is composed of the subscriber identity may have a tariff, which is higher than normal tariffs of the network 2' and which also includes a compensation for the network 1' operator.

Figure 5:
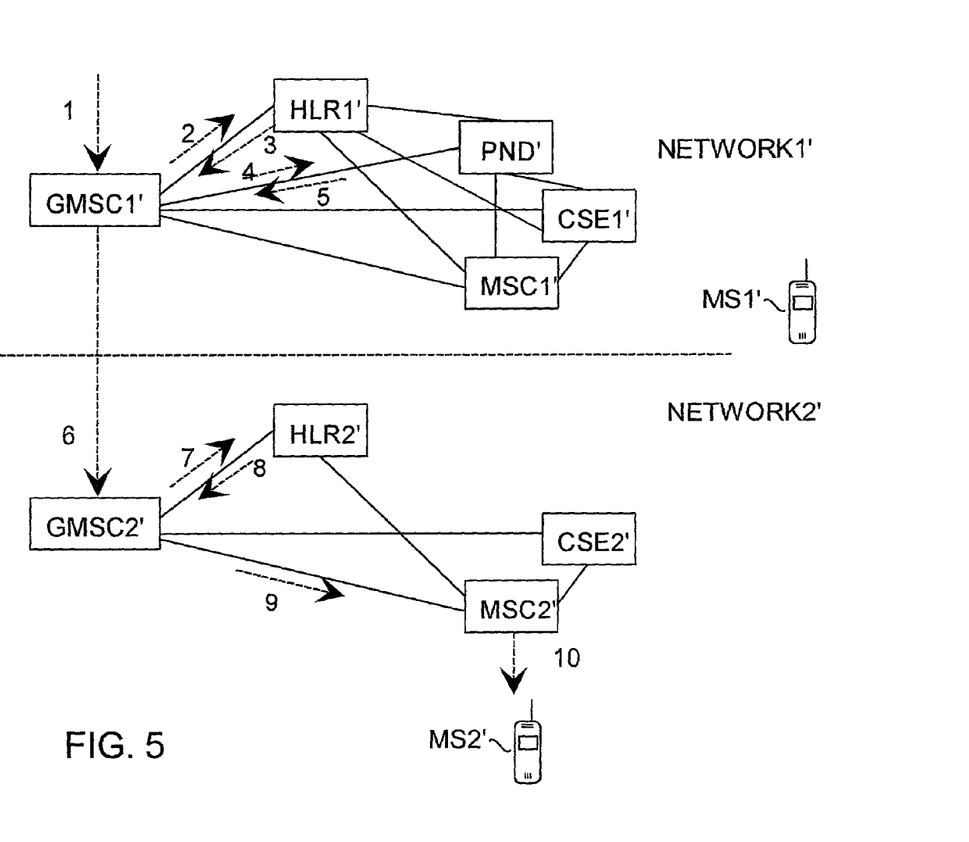
FIG. 5 shows a block diagram of an embodiment of the system of the invention.

FIG. 5 shows a block diagram of an embodiment of the system of the invention, in which embodiment the first MS1' and the second MS2' mobile station are mobile stations of different mobile communication networks, and the subscriber identity of the first mobile station MS1' is transferred into the subscriber profile of the second mobile station MS2'.

In the embodiment of FIG. 5, an indicator of the transfer of an interface into a subscriber profile is recorded in the subscriber register of the first mobile station MS1' when a subscriber identity is being transferred. This makes the subscriber register reply to the subscriber data inquiry (SendRoutingInformation) as if the subscriber were unknown in the subscriber register. Unlike deletion of subscriber data, the indicator in question does not, however, hinder outgoing calls and location updatings from the mobile station MS1'.

FIG. 5 illustrates routing of a terminating call when the terminating call is made by the MSISDN1 number of the first mobile station MS1'. Then the routing centre GMSC1' of the network 1' (the network of the mobile station MS1') receives a reply to the subscriber data inquiry sent to the subscriber register HLR1' that the subscriber number MSISDN1 is not known in the network 1'. The routing centre GMSC1' inquires a PND' network element (Portable Number Database) of the network to which the first mobile station MS1' is forwarded. In this case, the PND' network element returns the information of the network to whose mobile station MS2' the subscriber identity of the mobile station MS1' is transferred as subscriber profile. As a result of the reply of the PND' network element, the call routing proceeds to the routing centre GMSC2' of the network 2' (which is the network of the second mobile station MS2').

The routing centre GMSC2' of the second network 2' makes a subscriber data inquiry to the second subscriber register HLR2', and as a reply, it receives the necessary information to route the call to the mobile services switching centre MSC2' of the second network, from where the call is forwarded to the second mobile station MS2' in a manner known per se.

After the inquiry 4 the PND' network element, which may be an intelligent network service control point (IN-SCP), can in the case of FIG. 5 stay and measure the duration of the call, for example by setting IN events for call release and call reply, in order to be able to form a charging record for the call, or it can notify the mobile services switching centre MSC1' that it must exceptionally form the charging data from the call in question. The PND' network element can also give a charging record including a fixed tariff to the mobile services switching centre MSC1' or it can express a need for the use of the fixed tariff in the call. This way the network 1' operator can bill for a service, due to which the call is routed properly to the second mobile station MS2'.

When calls are made with the mobile station MS2' with a subscriber profile formed of the subscriber identity of the first mobile station MS1', charging records of the call are changed in post-processing of the network 2' into roaming records. Thus, the calls are billed in the equivalent way as in the case where the mobile station MS1' had been roaming in the network 2, as a subscriber of the network 1.

Figure 6:
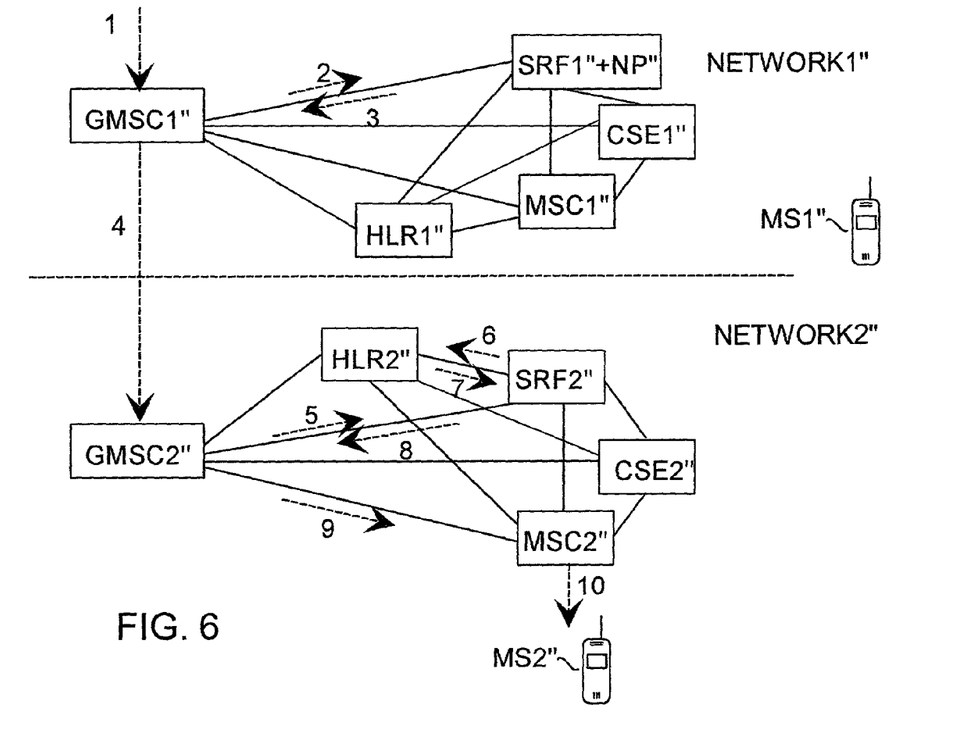
FIGS. 6 and 7 show a block diagram and a signalling diagram of an embodiment of the system of the invention.
Figure 7:
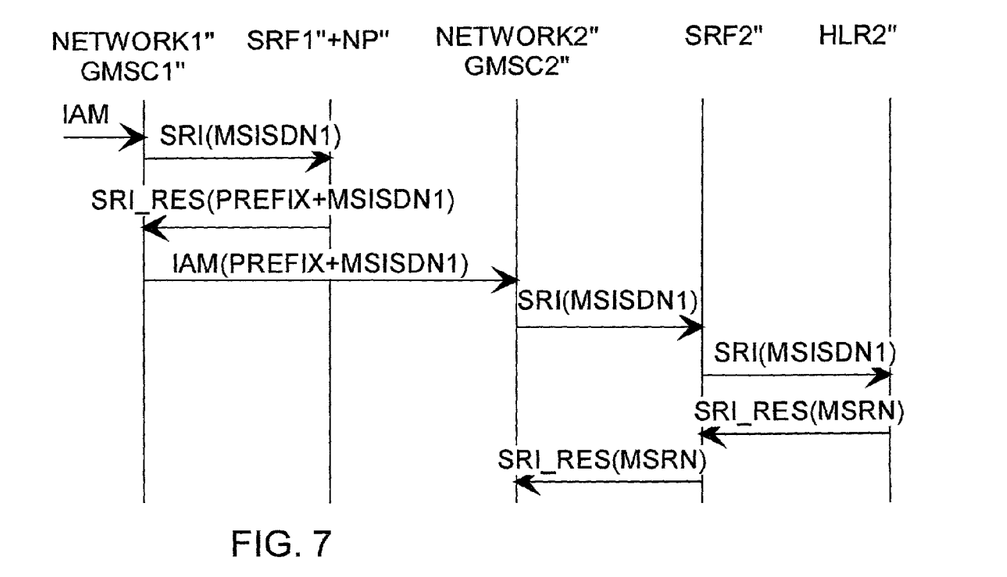
Figure 8:
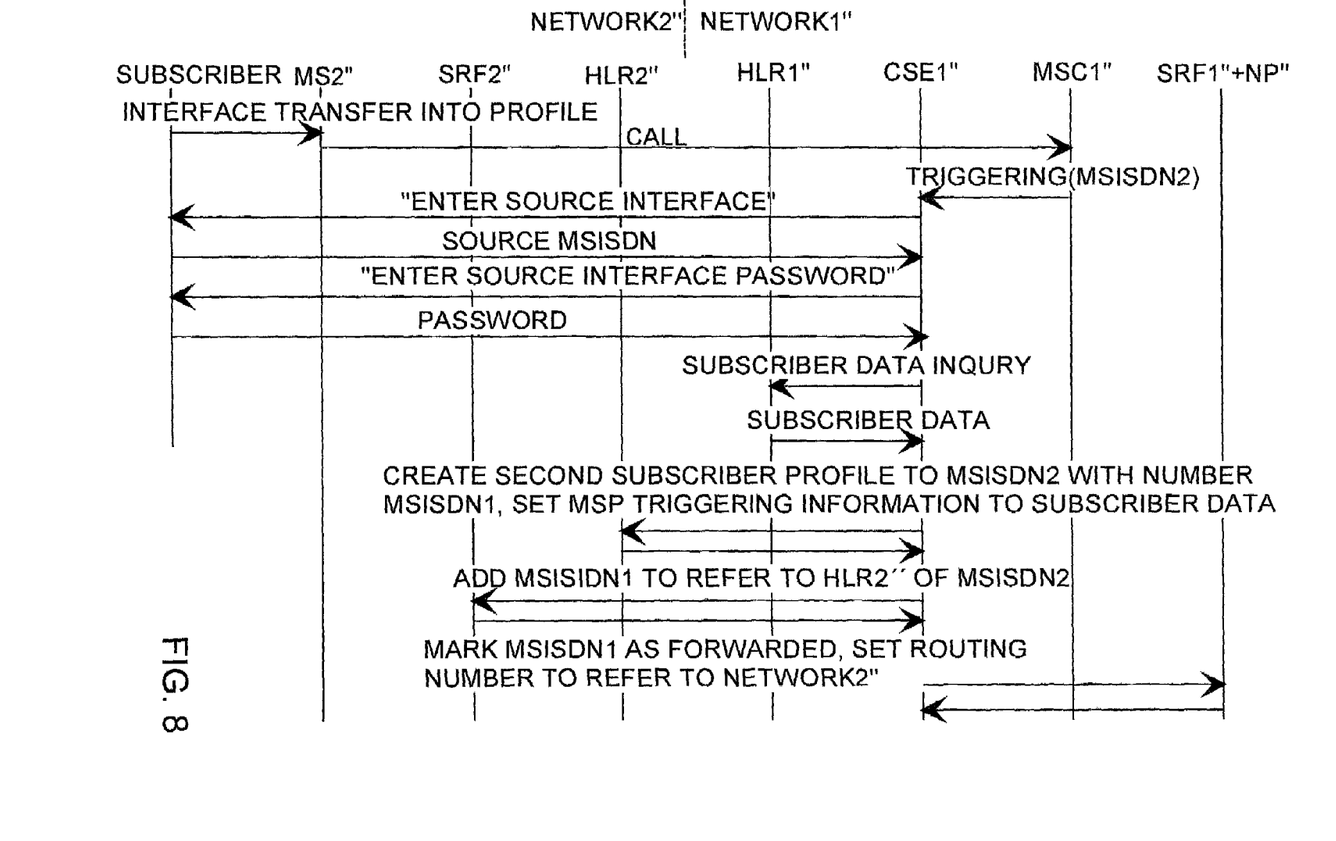
FIG. 8 illustrates signalling in connection with creation of a new subscriber profile in the embodiment according to FIGS. 6 and 7.

FIGS. 6 and 7 show a block diagram and a signalling diagram of an embodiment of the mobile communication system of the invention, and FIG. 8 illustrates signalling in the embodiment according to FIGS. 6 and 7, in which a new subscriber profile is being created.

FIGS. 6 and 7 illustrate a situation in which the first MS1" and the second MS2" mobile station are mobile stations of different mobile communication networks and in which the subscriber identity of the first mobile station MS1" has been transferred into the subscriber profile of the second mobile station MS2". FIGS. 6 and 7 illustrate routing of a terminating call when the terminating call is made from the MSISDN1 number of the first mobile station MS1".

In the embodiment of FIGS. 6 and 7, the original subscription combined as the subscriber profile of the mobile station MS2 of the second network 2 is handled as if the number of the original subscription were transferred into the second network. There is a difference, however, that the number refers to the alternative profile of the second subscription.

In FIG. 6, interfaces between a service control function CSE1", a subscriber register HLR1" and an SRF1" network element can be either direct or indirect, in which case it can be implemented for example via the network management system or subscriber management system. This concerns also interfaces between the corresponding elements in the network 2".

In FIG. 6, the routing centre GMSC1" of the network 1" (the network of the mobile station MS1") makes an inquiry to the SRF1" network element (Signalling Relay Function), which includes a number portability application NP". The SRF1" network element replies to the routing centre with a message which includes the number of the first mobile station MS1" with a prefix, or the number of the first mobile station MS1" and the routing number used for routing to the network 2" separately.

In the example of FIGS. 6 and 7 it is assumed that as the subscriber identity of the first mobile station MS1" is transferred into the subscriber profile of the second mobile station MS2", the new subscriber profile is indicated in the network 2" by the MSISDN number of the first mobile station MS1".

The routing centre receives the information referring to the second network 2", and the call routing is transferred to the routing centre GMSC2" of the second network 2". The second network routing centre makes a subscriber data inquiry from the SRF2" network element and the inquiry is conveyed to the second network subscriber register HLR2". In a manner known per se, the subscriber register HLR2" makes an inquiry from the visitor location register of that mobile services switching centre on whose area the second mobile station MS2" is located. As a reply to the inquiry, the subscriber register HLR2" receives a roaming number MSRN, which is conveyed from the SRF2" network element to the routing centre GMSC2".

From the routing centre GMSC2" the terminating call is forwarded to the mobile services switching centre MSC2" of the second network 2 in a manner known per se, after which the call is connected to the second mobile station MS2".

In FIG. 6, a reply to the routing information inquiry that is returned by the SRF1" element of the first network 1" or a routing number to the second network may include a special indicator, which causes that a routing of a transferred number to a new subscription network, which is otherwise free, becomes now chargeable, for example such that a charging record is formed of it. More generally this indicator causes a case in which a call made to the transferred number and which is routed to a new subscription network, can be separated from the case in which the number is not transferred, but a subscriber profile is formed of the network 1" subscriber identity to the network 2". In these different cases, a different tariff can more generally be used.

The above indicator can be IN triggering information to the routing centre GMSC1" of the original network 1", which routing centre causes an inquiry to be made to the service control function CSE". If the system functions in accordance with the CAMEL recommendations while handling a terminating call, the first SRF1" element inquiry returns only the IN triggering information, and the SRF" inquiry repeated later after the IN triggering returns the routing number, which forwards to the second network. An indicator may also be a special prefix reserved for this purpose in the prefixed MSISDN number returned by the SRF1" network element or in the separate routing number from the network 1" to the network 2".

An alternative, by which the network 1" operator can bill for the routing to the second network 2", is that an immediate call forwarding to the second interface in the second network is defined in the original network 1" in such a manner that a call forwarding number (number C) includes an identifier referring to the subscriber profile created for the second mobile station MS2". A number referring to the created subscriber profile can also be reserved from the second network 2", the number being used only for call forwarding from the original network 1" to the second network 2". In IN triggering, the service control function CSE1" may return the IN control, which sets a tariff for routing from one network to another or causes that a charging record is made of this in the GMSC1".

Figure 9:
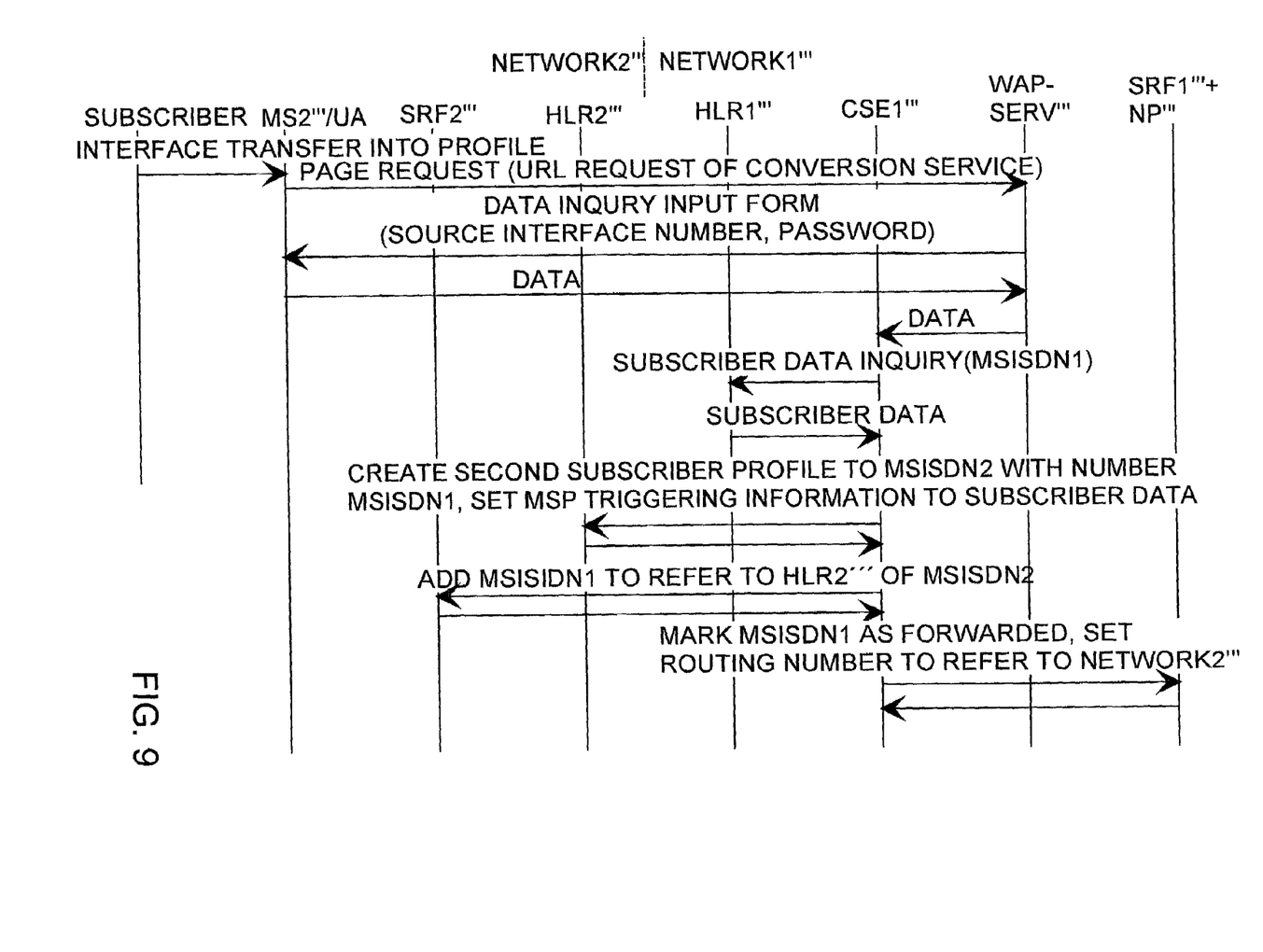
FIG. 9 illustrates signalling in connection with creation of a new subscriber profile in the WAP environment, when the first and the second mobile station are subscribers in different networks.

FIG. 9 illustrates signalling in the WAP environment, while a new subscriber profile is being created and when the first and the second mobile station are subscribers of different networks. In FIG. 9, conversion service is offered to subscribers from the WAP server WAP-SERV''', which is in connection with the service control function CSE1'''.

It is assumed in FIG. 9 that a subscriber uses a mobile station MS2'''/UA, which employs User Agent, i.e. a WAP browser. The connection between the second mobile station MS2'''/UA and the WAP server WAP-SERV'''can be arranged via the WAP gateway, which performs the conversion between HTTP and WAP.

Using the WAP environment in the communication between a mobile station and a service control function enables the implementation of a more user-friendly user interface than before. This is achieved primarily due to the WAP environment enabling the use of clear input forms.

Figure 10:
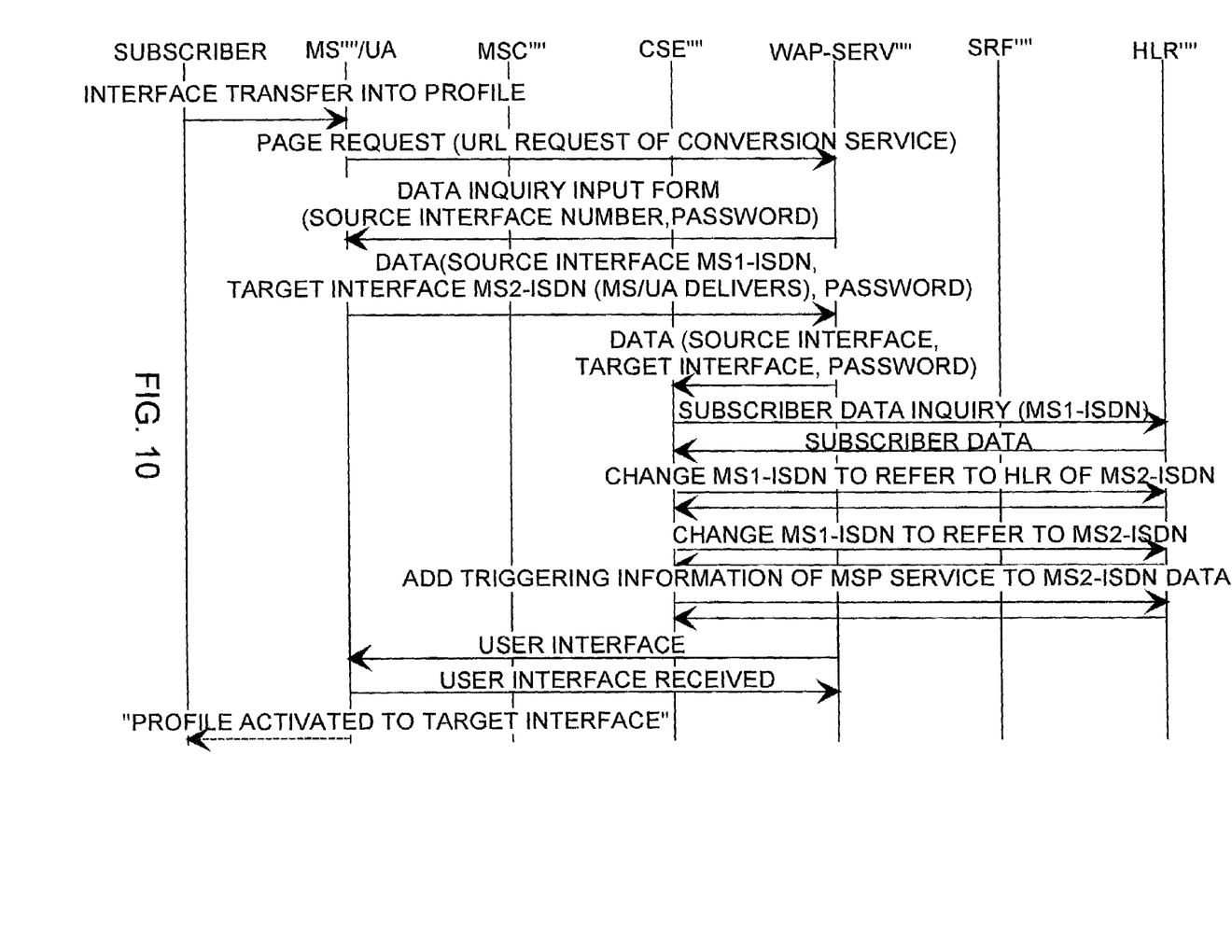
FIG. 10 illustrates signalling in connection with creation of a new subscriber profile in the WAP environment, when the first and the second mobile station are subscribers in the same network.

FIG. 10 illustrates signalling in the WAP environment, when a new subscriber profile is being created and when the first and the second mobile station are subscribers of the same network. When it comes to the other parts, the embodiment of FIG. 10 corresponds to that of FIG. 9.

Figure 11:
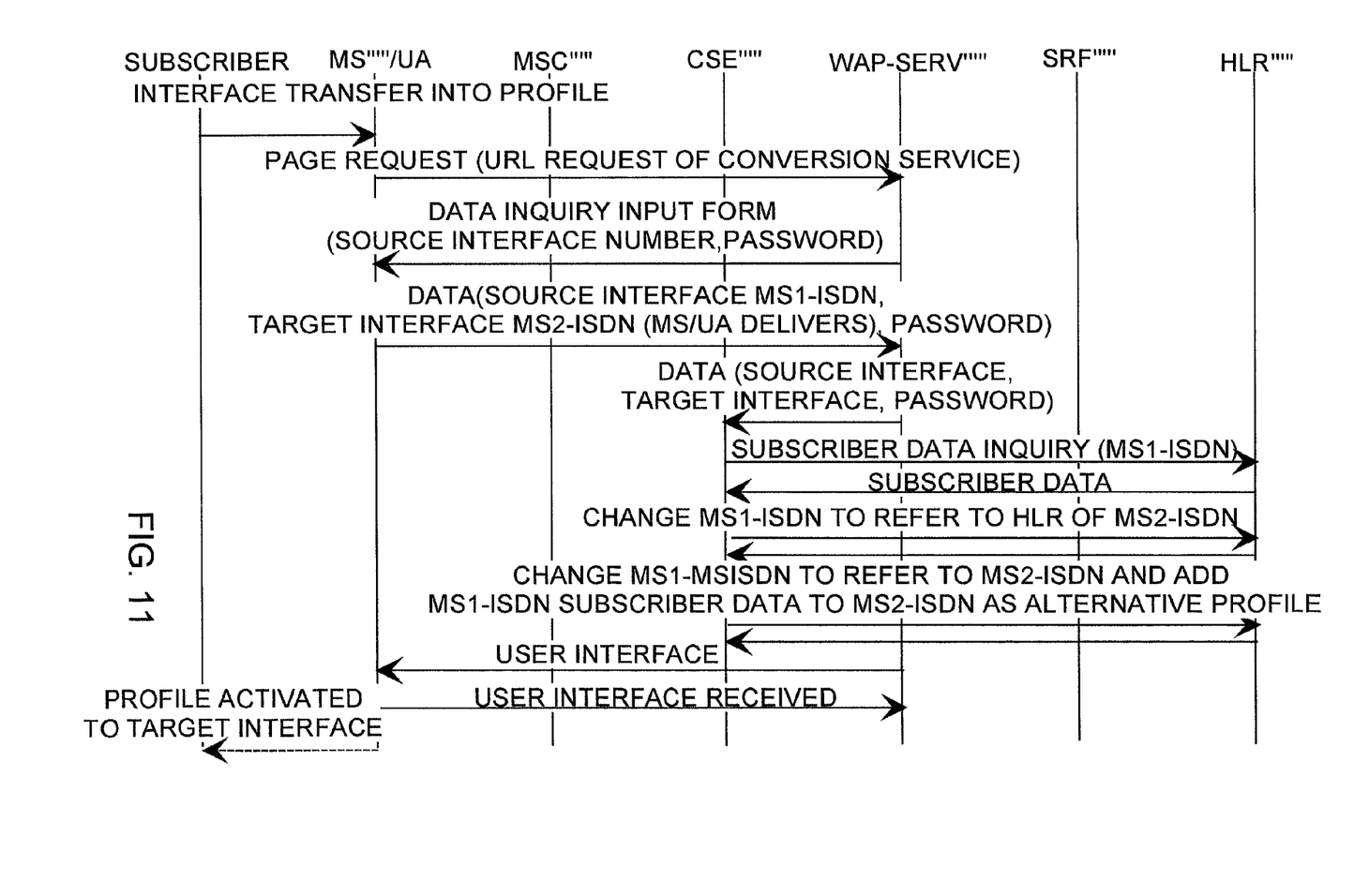
FIG. 11 illustrates signalling in connection with creation of a new subscriber profile in the WAP environment, when the subscriber data of the first and the second mobile station are in the same subscriber register.

FIG. 11 illustrates signalling in the WAP environment, when a new subscriber profile is being created and subscriber data of the first and the second mobile station are in the same subscriber register. In FIG. 11, an alternative subscriber profile is created for the second mobile station by copying the subscriber data of the first subscriber in the subscriber register HLR""such that the subscriber data of the first mobile station can be stored as the subscriber profile of the second mobile station.

In the embodiment of FIG. 11, information of several profiles is transferred in the signalling between the home (HLR) and the visitor location registers (VLR) in such a manner that each profile has its own services and IN triggering information. As a subscriber makes a call in this embodiment, he has to register a certain profile as a default profile of the mobile station in advance or alternatively to select a profile for use by means of a special prefix.

It is to be understood that the above description and the related drawings are only intended to illustrate the present invention. Thus, signalling between network elements may differ from what is described above by way of example. The invention is also applicable to some other mobile communication system than the GSM system mentioned above by way of example. Consequently, the invention can also be applied to a packet-switched GPRS environment (General Radio Packet Services), for example. The billing control can thus be arranged for example between the GPRS node and the service control function in such a manner that it can help to affect the subscriber identity to be billed, so that the call bills could be concentrated on the right mobile station. Other variations and modifications of the invention will also be apparent to a person skilled in the art without departing from the scope and spirit of the invention disclosed in the attached claims.

What is claimed is:

1. A method for managing facilities of a first mobile station in a mobile communication system, in which multiple alternative subscriber profiles can be defined for mobile stations, comprising:
   establishing a connection to a predetermined service control function,
   inputting information required for identification of the first and a second mobile station to the service control function,
   retrieving subscriber data of the first mobile station from a subscriber register of the first mobile station,
   forming a new subscriber profile for the second mobile station on the basis of the subscriber data retrieved from the subscriber register of the first mobile station such that calls can be made with the second mobile station by using the subscriber data of the first mobile station, and
   storing a reference to the second mobile station for the first mobile station in said subscriber register such that calls terminating at the first mobile station will be forwarded to the second mobile station.

2. A method as claimed in claim 1, comprising establishing said connection to the service control function from the second mobile station, and:
   transmitting at least an identification code associated with the first mobile station from the second mobile station to the service control function,
   checking on the basis of the subscriber data of the first mobile station whether the transmitted identification code is right, and
   forming a new subscriber profile for the second mobile station, and storing a reference to the second mobile station in said subscriber register only if said checking indicates that the transmitted identification code is right.

3. A method as claimed in claim 1, comprising:
   retrieving information on the mobile station services from the subscriber register of the first mobile station, and
   storing the information on said services in a subscriber register of the second mobile station, whereby a subscriber profile according to the subscriber identity of the first mobile station is formed for the second mobile station, the subscriber profile having the first mobile station services available.

4. A method as claimed in claim 1, comprising storing an indicator in the subscriber register of the first mobile station, indicating that the interface has been transferred into the subscriber profile of the second mobile station, whereby said subscriber register reports in response to a subscriber data inquiry of the first mobile station that the first subscriber is not known in the subscriber register.

5. A method for managing facilities of a first mobile station in a mobile communication system, in which multiple alternative subscriber profiles can be defined for mobile stations, comprising:
   establishing a connection to a predetermined service control function,
   sending information required for identification of the first and a second mobile station to the service control function,
   retrieving subscriber data of the first mobile station from a subscriber register of the first mobile station, forming a new subscriber profile for the second mobile station on the basis of the subscriber data retrieved from the subscriber register of the first mobile station, such that calls can be made with the second mobile station by using the subscriber data of the first mobile station, and storing a reference to the second mobile station for the first mobile station in said subscriber register such that calls terminating at the first mobile station will be forwarded to the second mobile station.

6. A method as claimed in claim 5, comprising establishing said connection to the service control function from the second mobile station, and by the first and the second mobile station being mobile stations of different mobile communication networks, whereby a reference to the second mobile communication network is stored for the first mobile station in a network element of the first mobile communication network.

7. A method as claimed in claim 5, comprising storing in an SRF element or PDN network element said reference for the first mobile station to the second mobile station.

8. A mobile communication system which comprises:
   at least a first and a second mobile station,
   a subscriber register which maintains at least subscriber data of the first mobile station,
   memory means which maintain information on subscriber profiles of the second mobile station, and
   a service control function comprising means for:
   retrieving the subscriber data of the first mobile station from the subscriber register of said first mobile station,
   forming a new subscriber profile for the second mobile station on the basis of the subscriber data retrieved from said subscriber register, such that calls can be made with the second mobile station by using the subscriber data of the first mobile station, and
   storing a reference to the second mobile station for the first mobile station in said subscriber register such that calls terminating at the first mobile station will be forwarded to the second mobile station.

9. A mobile communication system as claimed in claim 8, wherein the service control function comprises means for identifying the first mobile station on the basis of information that is conveyed from the second mobile station, and that said information is conveyed from the second mobile station to the service control function in connection with a call made to a predetermined service number with the second mobile station, whereby the service control function identifies the second mobile station on the basis of the subscriber identity A relating to said call, and the first mobile station on the basis of DTMF signals conveyed from the second mobile station during the call.

10. A mobile communication system as claimed in claim 8, wherein the service control function comprises means for identifying the first mobile station on the basis of information conveyed from the second mobile station, and that said information is conveyed from the second mobile station to the service control function by a text message sent with the second mobile station to a predetermined service number, whereby the service control function identifies the second mobile station on the basis of the subscriber identity A relating to the text message and the first mobile station on the basis of a telephone number included in the text message.

11. A mobile communication system as claimed in any one of claims 8 to 10, wherein said mobile communication system is a GSM system.

12. A mobile communication system as claimed in claim 8, wherein
   said mobile communication system comprises a variety of subscriber registers and a register, in which a reference to the mobile station subscriber register in question is stored in association with the MSISDN number of each mobile station, and that
   the service control function comprises means for controlling said register such that the reference stored in association with the MSISDN number of the first mobile station refers to the subscriber register of the second mobile station.

13. A mobile communication system as claimed in claim 8, wherein:
   said mobile communication system comprises a variety of subscriber registers,
   said mobile communication system comprises at least one routing mobile services switching centre comprising means for transmitting a subscriber data inquiry to one of said several subscriber registers on the basis of an analysis made of the MSISDN number relating to the call to be routed, and that
   the service control function comprises means for controlling said routing mobile services switching centre such that the analysis of the MSISDN number of the first mobile station made by the routing mobile services switching centre indicates that the subscriber data inquiry must be transmitted to the subscriber register of said second mobile station.

14. A mobile communication system as claimed in claim 8, wherein the system comprises a WAP server in data transmission connection with the service control function, the WAP server comprising means for receiving information that is conveyed from the second mobile station in a format according to the WAP protocol, and for inputting the received information to the service control function in order to establish a new subscriber profile for the second mobile station.

15. A service control function which is in data transmission connection with a mobile communication system comprising a mobile services switching centre, at least a first and a second mobile station, a subscriber register which maintains at least the subscriber data of the first mobile station, and memory means which maintain information on subscriber profiles of the second mobile station, wherein the service control function comprising means for:
   retrieving the subscriber data of the first mobile station from the subscriber register of said first mobile station,
   storing in said memory means a new subscriber profile for the second mobile station on the basis of the subscriber data retrieved from said subscriber register, and
   storing a reference to the second mobile station for the first mobile station in said subscriber register.

16. A service control function as claimed in claim 15, wherein:
   said mobile communication system comprises a variety of subscriber registers and a register, in which a reference to the mobile station subscriber register in question is stored in association with the MSISDN number of each mobile station, and that
   the service control function comprises means for controlling said register such that the reference stored in association with the MSISDN number of the first mobile station refers to the subscriber register of the second mobile station.

* * * * *